United States Patent
Childs et al.

(10) Patent No.: US 8,364,138 B2
(45) Date of Patent: Jan. 29, 2013

(54) REMOTE LOCKING ARRANGEMENTS FOR ELECTRONIC DEVICES

(75) Inventors: Philip L. Childs, Durham, NC (US);
Michael T. Vanover, Raleigh, NC (US);
Tomoki Maruichi, Sagamihara (JP);
Terry A. Buschbach, Cary, NC (US);
Adam M. Smith, Chapel Hill, NC (US);
Lisa L. Carter, Durham, NC (US);
Joseph M. Pennisi, Apex, NC (US);
Masahiko Shinomura, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 315 days.

(21) Appl. No.: 12/341,545

(22) Filed: Dec. 22, 2008

(65) Prior Publication Data

US 2010/0159911 A1    Jun. 24, 2010

(51) Int. Cl.
*H04W 12/00* (2009.01)
*H04W 4/14* (2009.01)
*H04L 9/32* (2006.01)
*H04M 1/68* (2006.01)

(52) U.S. Cl. .................... 455/419; 455/411; 455/466
(58) Field of Classification Search .......... 455/410–411, 455/414.1–414.4, 418–420, 422.1; 719/315; 340/5.2
See application file for complete search history.

(56) References Cited

U.S. PATENT DOCUMENTS

| | | | |
|---|---|---|---|
| 2005/0047356 A1* | 3/2005 | Fujii et al. | 370/311 |
| 2005/0166213 A1* | 7/2005 | Cromer et al. | 719/315 |
| 2005/0221800 A1* | 10/2005 | Jackson et al. | 455/411 |
| 2009/0086657 A1* | 4/2009 | Alpert et al. | 370/310 |

* cited by examiner

*Primary Examiner* — Kamran Afshar
*Assistant Examiner* — Kashif Siddiqui
(74) *Attorney, Agent, or Firm* — Ference & Associates LLC (57) ABSTRACT

The invention broadly contemplates locking methods and arrangements for electronic devices, including laptop personal computing (PC) devices. The invention provides methods and arrangements for authorizing remote devices, such as cellular phones, to control the locking of electronic devices, such as laptop PCs. After receipt of a lock message from an authorized device at a guaranteed buffer, the laptop PC becomes locked such that only an authorized user may enable the functionality of the device.

16 Claims, 6 Drawing Sheets

DIAGRAM 1— REGISTER PHONE

FIG. 1

DIAGRAM 1— REGISTER PHONE

REMOTE LOCKING ARRANGEMENTS FOR ELECTRONIC DEVICES

FIELD OF THE INVENTION

The invention relates generally to remote locking arrangements for computers or similar electronic devices. More specifically, the present invention is directed to methods and arrangements for locking an electronic device (e.g. a laptop personal computer (PC)) remotely with a message (e.g. a text message).

BACKGROUND OF THE INVENTION

Having a computer (e.g. a laptop PC or similar electronic device) stolen or become lost is an all too common occurrence. Unfortunately, a lost or stolen computer can cause many problems aside from losing the machine itself. Valuable data and information may come into the wrong hands. Therefore, conventional arrangements for protecting computers and like devices have been established.

Conventional solutions require that the computer be turned on/powered up, connected to the internet, signed up with a third party, and/or have third party software running. For Example, some conventional services provide monitoring of PC's for a fee. If a user signs up for such a service (e.g. ABSOLUTE SOFTWARE CORP. is a company that has such products, e.g. Computrace®), a user can pay a fee and call up and report that the computer is stolen. Wireless or hardwired, the computer makes an Internet connection and updates it status with the service provider. If a customer reports that the computer is stolen, then software will disable the computer and attempt to find it. However, such services require that the PC at least remain powered on (and connect to the Internet) for the third party service to be effective. It will often be the case, however, that the computer will be powered off and/or without an Internet connection.

Therefore, a need has arisen for an arrangement capable of locking or disabling a computer or similar electronic device in a simple manner that remains effective even if the machine is powered off or unable to acquire an Internet connection.

SUMMARY OF THE INVENTION

There is broadly contemplated herein use of messages (e.g. SMS text messaging) from a customer's registered device (e.g. a mobile phone) to disable a stolen or lost electronic device (e.g. a laptop PC) using a guaranteed buffer. Software running in the laptop PC's BIOS will interrogate the guaranteed buffer (e.g. an SMS Text Buffer on a WAN card) before the laptop PC is fully powered on and running to determine if there is a message to lock the laptop PC. In this manner, the laptop PC's operating system (OS) is not allowed to boot unless the current operator knows the unlock code. In a similar manner, a running OS will be stopped if a lock message is received in the guaranteed buffer. Briefly stated, the present invention provides for: securely register a customer's cell phone, securely setting and changing a lock/unlock phrase, detecting lock commands when resuming from hibernate or off states through BIOS, detecting lock commands when running or resuming from suspend states through an OS (e.g. a WINDOWS XP operating system) application software, ensuring the guaranteed buffer (e.g. SMS Text Buffer) is never overrun or inaccessible, locking the computer at BIOS prompt, waiting for an unlock phrase, and clearing a lock state at a manufacturer's location.

In summary, one aspect of the present invention provides a method comprising: receiving a lock message from an authenticated remote device at a guaranteed buffer of an electronic device; storing the lock message in the guaranteed buffer; ascertaining that the lock message is stored in the guaranteed buffer; and locking the electronic device after ascertaining that the lock message is stored in the guaranteed buffer.

Another aspect of the present invention provides an apparatus comprising: a processor; a receiver module having a guaranteed buffer; and a program storage device that tangibly stores a program of instructions that are executable by the processor of the apparatus to perform the following: receiving a lock message from an authenticated remote device at the receiver module; storing the lock message in the guaranteed buffer; ascertaining that the lock message is stored in the guaranteed buffer; and locking the apparatus after ascertaining that the lock message is stored in the guaranteed buffer.

A further aspect of the present invention provides a program storage device readable by machine, tangibly embodying a program of instructions executable by a processor of the machine to perform a method comprising: receiving a lock message from an authenticated remote device at a guaranteed buffer; storing the lock message in the guaranteed buffer; ascertaining that the lock message is stored in the guaranteed buffer; and locking the machine after ascertaining that the lock message is stored in the guaranteed buffer.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

It will be readily understood by those having ordinary skill in the art that the components of the present invention, as generally described and illustrated in the figures herein, may be arranged and designed in a wide variety of different configurations. Thus, the following more detailed description of the embodiments of the apparatus, system, and method of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of hardware, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected embodiments of devices, systems, and processes that are consistent with the invention as claimed herein. The following description begins with a general overview of the present invention and then refers to the figures to provide more details. Specific examples are described below with reference to an embodiment of the present invention with reference to a laptop PC and a cellular phone. Those having ordinary skill in the relevant art will readily understand, however, that other suitable electronic devices may also be utilized.

According to one embodiment of the present invention, a guaranteed buffer is provided wherein a lock message is always receivable and accessible to the electronic device. A guaranteed buffer is therefore a buffer always having power supplied and always having sufficient space provided such that a received lock message is stored and accessible in the guaranteed buffer, regardless of the operating state of the computer. A specific example of a guaranteed buffer is provided in the following description. It will be readily understood by those having ordinary skill in the are that although a guaranteed buffer is described in the context of an SMS Text Message Buffer located on a WAN card, the guaranteed buffer may take other forms or be implemented in alternative arrangements so long as the same functionality is achieved.

According to one embodiment of the present invention, a guaranteed buffer is provided on a network component (e.g. a wireless WAN adapter/card or on a SIM plugged into the WAN card) that remains powered on. This network component need not be tied to the power state of the overall computer. Currently, the BIOS (e.g. of a Lenovo ThinkPad® Series computer) has special code stored in it to keep the wireless WAN adapter powered on, even when the computer proper is powered off. Wireless WAN adapters are provided in the electronic device (e.g. on a data card—which can be/are built into laptop PCs, e.g. a Lenovo ThinkPad® T500 computer). This allows the computer to receive text messages even when powered off or otherwise in a sleep state (e.g. hibernate or suspend). Thus, if a text message comes to the phone number of the computer with the correct code, etc., it can reside in the SMS Text Buffer. Then when the computer is finally turned on (assuming it is powered off) or otherwise becomes "awake", it checks the wireless WAN card SMS Text Buffer area to see if a lock command has been received. If it has, the computer will lock and prevent the operating system from booting. Thus, the present invention utilizes a guaranteed buffer and does not rely on Internet connectivity, power on status, etc.

The WAN card of the laptop PC has the phone number of the laptop PC. For example, a SIM card is activated and the service provider (e.g. a phone company) will assign it a phone number. So it is the phone number of the SIM card which is embodied within the laptop PC component which permits the laptop PC to receive text messages from other devices.

According to one embodiment of the invention, there is provided a mechanism to securely register a customer's cell phone with the laptop PC to be protected. Essentially, the laptop PC runs a specific security application that allows the user to add/register cell phone(s). There is provided a window (of time, e.g. five minutes) in order to send from the cell phone to be registered a text message that indicates a request for authorization/registration with the laptop PC. Upon receipt of such a message, an indication (e.g. a message window) comes up on the laptop PC (e.g. on a display device), giving the phone number of the phone that is requesting authorization/registration. At this point, the user of the laptop PC authorizes/registers the phone with the laptop PC if that is desirable. Thus, a combination of having both the cell phone and the laptop PC available in a certain time window, and sending particular information from the cell phone (e.g. a password), allows the user to register the cell phone with the laptop PC.

As a non-limiting example, according to one embodiment of the present invention, a user starts at the laptop PC and sets a password desired to lock and unlock the laptop PC. Thus, the laptop PC is password protected prior to the addition of any phone(s). The properly logged in user then runs a security application. The application will display a dialogue box of the phone number of the laptop PC (associated with the SIM card, as discussed above). Then, using a cell phone, the user creates a text message to the phone number of the laptop PC with an authorization command, such as: !AUTH, in the text message. The text message may also contain the actual password initially given to the laptop PC, as above. Then the user sends the SMS text message to the laptop PC. The laptop PC displays a dialogue box that indicates that it has received a request to authorize (i.e. from the user's cell phone number). The laptop PC will then prompt the user to identify if this is correct. Upon the user indicating that this is correct, the cell phone is added to the laptop PC's directory and is authorized to lock and unlock the laptop PC.

By locking the laptop PC it is meant that upon the user sending a lock command via text message, if the laptop PC is on (i.e. running an OS, for example, Microsoft WINDOWS XP operating system), it immediately shuts down. Any attempt thereafter (or if the laptop PC is off when the message is received) to power on will be met with a request for the password. Thus, the laptop PC will not allow a user continue to boot into the OS (e.g. WINDOWS XP operating system) unless the password is properly entered. This is a BIOS executed function. The password required is preferably a separate password from the system password. The required password is that which is used to unlock with this particular solution.

Other or additional actions (than blocking the booting of the OS) are possible. As non-limiting examples, the laptop PC could be instructed to begin deleting certain files, take a picture with a camera, utilize a location system (e.g. GPS), or run any of a number of generic functions (e.g. send a file history) related to a scenario wherein the laptop PC has been lost or stolen (and thus locked).

There are numerous ways that the password could be reset, updated, etc. Non-limiting, presently preferred examples are described herein. As one example, A user can launch the security application at the laptop PC and change the password through the security application without re-registering any phone(s). The user has the ability to send the new password via SMS text message from the laptop PC to the registered/authorized phones.

Another unique feature is that if a user has forgotten what the password is, a mechanism whereby a user is enabled to go to an application (on the laptop PC) and reset the forgotten password via text message sent to registered phone(s). A particular temporary key or temporary password will be sent via text message to the phone(s) and the user types this password in at the laptop PC within a certain predetermined time window. At this point, the user can reset the password to a new value. Thus, the laptop PC can generate a temporary password and send it out to the registered cell phone(s). The temporary password can then be used to reset the current password. Those having skill in the art will recognize that adaptations to the above scheme(s) may be made and fall within the scope of the present invention.

According to an embodiment of the present invention, once the laptop PC is locked, a user at the laptop PC entering the appropriate password can unlock it. It is presently preferred that the computer only be unlocked via a user at the laptop PC, entering the password. Those with skill in the art will recognize, however, that other means for unlocking are capable (e.g. using an SMS text message to affect the reverse of the locking message).

According to an embodiment of the present invention, the lock command (sent via SMS text message and stored in the guaranteed buffer (e.g. an SMS Text Buffer) and accessible to BIOS) is detected from hibernate and off states in the following ways. If the laptop PC is in a hibernate state or an off state, when the BIOS starts up, it goes and looks on the wireless WAN card to ascertain if a command is present in the guaranteed buffer and what the command is. As an example of a command, "!LOCK" indicates a lock command. If BIOS finds that command in the SMS Text Buffer, then it locks the computer right there at BIOS and does not permit OS booting to proceed. No further procedures are permitted.

The locking scenario when resuming from a suspend state is different due to a design implementation choice. Although resuming from a suspend state could be implemented using BIOS, it has been found that the amount of time required to check for the lock command during each resume is not desirable. Thus, a service-based implementation is presently preferred in this case. Thus, according to an embodiment of the present invention, there is an application service program running in an OS environment (e.g. WINDOWS XP operating system) that controls the locking mechanism. This would also cover the scenario where the computer is not in a suspend state but is actually running at the time of receipt of the lock command (via text message).

Preferably, there is a service in the OS that ascertains the lock command via looking through the SMS text messages stored in the guaranteed buffer. If such a lock command is ascertained, the service will immediately shut down the laptop PC. This shut down is immediate inasmuch as it is not a normal shut down procedure; rather, this shut down occurs in approximately less than a second and can be characterized as a crash-kill of the laptop PC (i.e. the laptop PC is reset and BIOS will be required to reboot the laptop PC). The application service uses an OS call to force the shutdown. The particular OS call is for example InitiateShutdown with the following flags set: SHUTDOWN_FORCE_OTHERS, SHUTDOWN_FORCE_SELF, SHUTDOWN_GRACE_OVERRIDE, SHUTDOWN_NOREBOOT, and SHUTDOWN_POWEROFF.

For example, consider a scenario where an unauthorized user (e.g. a thief) is running the laptop PC (i.e. the OS is up and running) and the authorized user (e.g. the owner) sends a lock command from a registered/authorized cell phone upon learning that the laptop PC has gone missing. The laptop PC receives that text message and the application program that is running (in the background, continuously) on the laptop PC periodically polls the SMS text messages stored in the guaranteed buffer to ascertain the lock command. Upon receipt and ascertaining of the lock command, the laptop PC shuts down.

According to one embodiment of the present invention, the service running in the background is a sensitive service. The service polls periodically for lock command messages (e.g. once per 10 minutes—though this period could be changed to a higher or lower time frame depending upon the desired balance between performance and security). A user must have administrative-level rights to remove or stop the service program. Moreover, the underlying scheme is not compromised if the service is shut down. In other words, if an unauthorized user (e.g. a thief) were capable of obtaining administrative rights and shutting down the service, the next time the laptop PC goes into a state where BIOS is required to boot the OS (e.g. hibernate or shut down), the above described BIOS method would ascertain the lock command text message and lock the laptop PC, prompting for a password. Those with skill in the art will also recognize that there are other ways of achieving security in the above scenario. For example, an implementation where the service is running in a hypervisor, the hypervisor is capable of waiting for a message to lock. In this scenario, the service could not be stopped by any user account, thus making the solution more robust.

According to one embodiment of the present invention, as described above, the guaranteed buffer retains enough space for an incoming lock message. Those having ordinary skill in the art will recognize that there are many ways in which sufficient space can be retained in a buffer arrangement. A specific, non-limiting example of ensuring sufficient space within the guaranteed buffer is given below; however, those having ordinary skill in the art will recognize that so long as similar functionality is achieved, other guaranteeing mechanisms are suitable and fall within the scope of the present invention.

To ensure enough space within the guaranteed buffer, one embodiment of the present invention periodically clears the SMS Text Buffer such that it cannot be overrun (e.g. by an attack from a third party). Preferably, the guaranteed buffer itself is sized to contain approximately 300 text messages at a given time. When BIOS boots up, BIOS is adapted to ascertain that the buffer is running short of space (e.g. is a certain percentage full). BIOS is adapted to delete older SMS text messages to make sure there is enough space for any potential incoming text messages. A similar functionality is achieved by the application service when the computer is running in an OS environment (e.g. it also checks every 10 minutes and is capable of ascertaining that the buffer is getting too full and will delete older messages). Again, modifications are possible and considered within the scope of the present invention.

In the event that an inappropriate lock command text message is sent from a user that is nominally authorized (e.g. a recently terminated employee), there is a way to subvert the lock command text message. For example, a set BIOS supervisor password can be used to start up the computer, making the need for the user-defined password associated with the lock command (described above) unnecessary. If there is no BIOS supervisor password set, the motherboard may need to be replaced. However, the manufacturer of the motherboard will have access to utilities that could reclaim the motherboard (e.g. by either replacing some chips or running a special adapter). However, substantial cost would be implicated and this scenario should be avoided where possible.

Those with skill in the art will readily appreciate that other means of communication with the laptop PC are possible other than SMS text messaging (e.g. registered email). However, SMS text messages are presently preferred due to increased security offered by such a communication.

Referring now to the figures, select presently preferred embodiments will be described with reference to the figures. The scope of the invention is pointed out in the appended claims.

Figure 1:
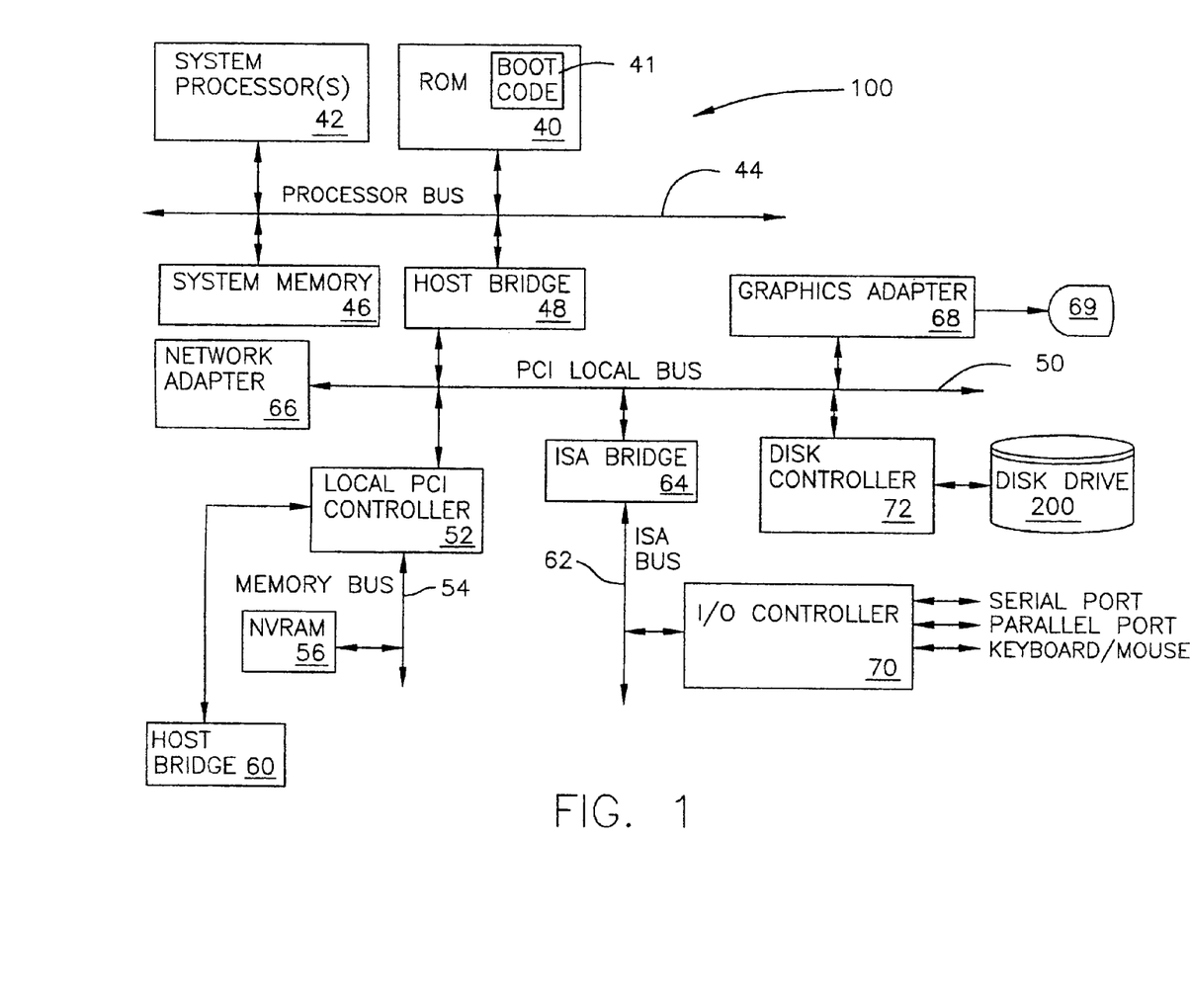
FIG. 1 there is depicted a block diagram of an illustrative embodiment of a computer system.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc of Morrisville, N.C. or a workstation computer, such as the ThinkStation®, which are sold by Lenovo (US) Inc. of Morrisville, N.C.; however, as will become apparent from the following description, the present invention is applicable to operation by any data processing system.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
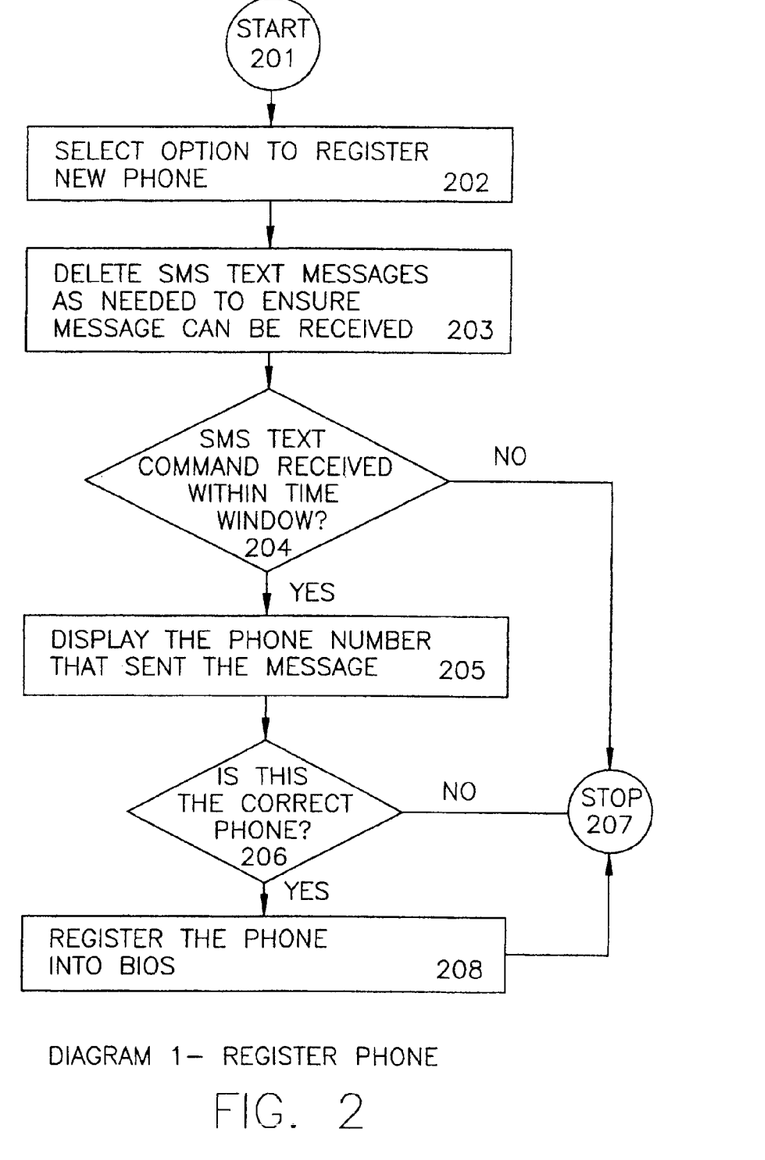
FIG. 2 provides a flow chart of phone registration according to one embodiment of the invention.

FIG. 2 provides a flow chart of how a phone is registered to a laptop PC. Only lock messages from registered phones will lock the laptop PC. If there is not enough room in the guaranteed buffer to receive the SMS messages required, the service will make room. First an OS application or program is started (201) that permits registration. A user selects an option to register a phone (202) (more than one phone can be registered). If necessary, the utility will delete older text messages (203) to ensure appropriate space in the guaranteed buffer to store incoming registration messages. A time window is started at the laptop PC. Within this time window, the user must send a properly formatted SMS text message (e.g. containing the preset password) to the laptop PC's phone number. If the text message is received within the time window (204), a display (205) of the phone's number appears (i.e. the phone that sent the text message). If the correct phone has sent the text message (206), the phone is registered into BIOS (208) by a user. If the phone number displayed does not correspond to the appropriate phone or does not contain the proper information, then the registration process is stopped (207).

Figure 3:
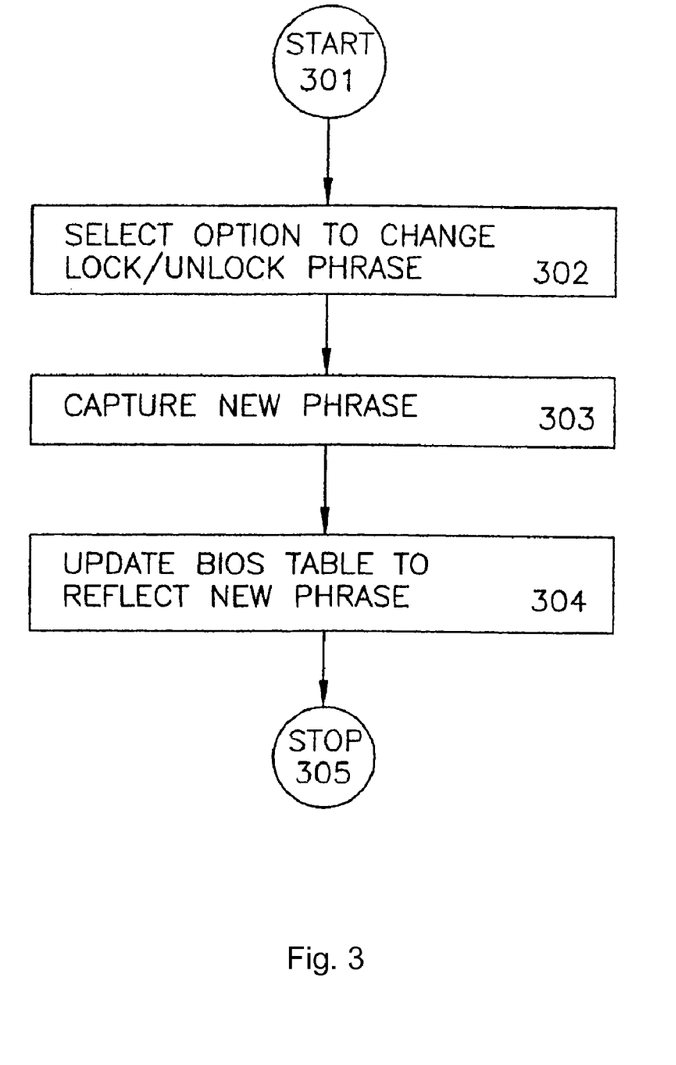
FIG. 3 provides a flow chart of updating a lock/unlock phrase according to one embodiment of the invention.

FIG. 3 depicts a flow chart of how the lock/unlock phrase can be updated. BIOS tracks the phone numbers that are registered (preferably at least 10 phone numbers at a time can be stored and tracked) and is also responsible for validating the password. Preferably the lock/unlock phrase is stored in tables in BIOS, hence, the phones do not need to be re-registered or even notified that the phrase has changed. The authorized user(s) simply needs to remember what the lock/unlock phrase/password is or has been updated to be (in order to lock/unlock the laptop PC). To reset the phrase, a user starts an OS application or program (301). The user then selects an option to change the lock/unlock phrase (302). The user then enters a new phrase that is captured by the utility and stored (303). The BIOS table is then updated to reflect the new phrase (304). Upon completion of the update, the process stops (305). The registered phones can be contacted via messaging to inform them of the new password, if desired.

Figure 4:
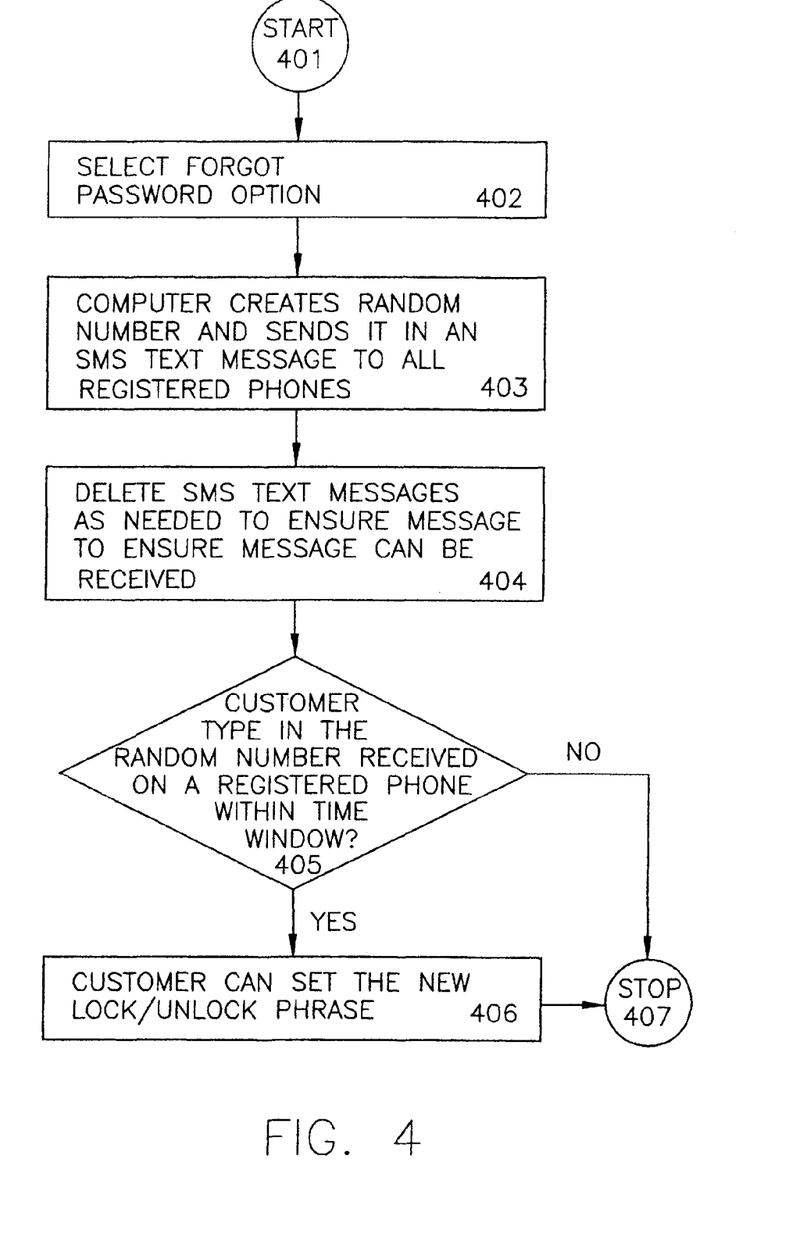
FIG. 4 provides a flow chart of obtaining a lock/unlock phrase according to one embodiment of the invention.

FIG. 4 is a flow chart of how a user can reset a lost lock/unlock phrase. If a user forgot the lock/unlock phrase and still has the computer and one of the registered phones, the phrase can be reset as follows. If there is not enough room in the guaranteed buffer to receive the SMS messages required, the service will make room for the required message. An OS application or program is started by the user (401). A user then selects a lost password option (402). The laptop PC then executes a functionality wherein a random number is generated and sent via SMS text message to all currently registered phones (403). The laptop PC is enabled to delete older text messages as required from the guaranteed buffer (404). The user, having at least one registered phone in his or her possession, then responds to the SMS text sent by the laptop PC by typing in the random number received at the user's registered cell phone within a window of time (on the order of minutes) (405). The user can then set a new lock/unlock phrase (406). If the appropriate random number is entered into the application within the predetermined time, the lock/unlock phrase is reset and the process stops (407). If not, the process terminates (but may be restarted).

There are several ways that at least one embodiment of the present invention can lock the computer in addition to the SMS text message(s), as described above (e.g. SMS text message sent from a registered phone that contains the lock command and the lock phrase to the computer). The detection of a disabled network component (e.g. WAN card), detection of a removed SIM card, detection of a disabled hardware device (e.g. via the control panel), or turning off the wireless switch, etc. could all trigger an automatic locking of the computer. Thus, methods employed by an unauthorized user to subvert the above-described SMS text message locking mechanism can be counteracted via various hardware and/or software implemented methods. For example, if it is detected that the WAN card has been disabled (either physically disconnected or via software action), the laptop PC would enter the shut down state as if it had been locked via the SMS text message arrangement. Moreover, a value of having a BIOS implementation is that even in the event that an unauthorized user totally wiped out the hard drive, once a registered user sends the SMS lock message, the BIOS would look for the message and if it ascertains that that it is resident in the guaranteed buffer, the computer will be locked. Thus, a presently preferred implementation for the above-described embodiments is in a combination of a WAN card guaranteed buffer and the BIOS execution.

Figure 5:
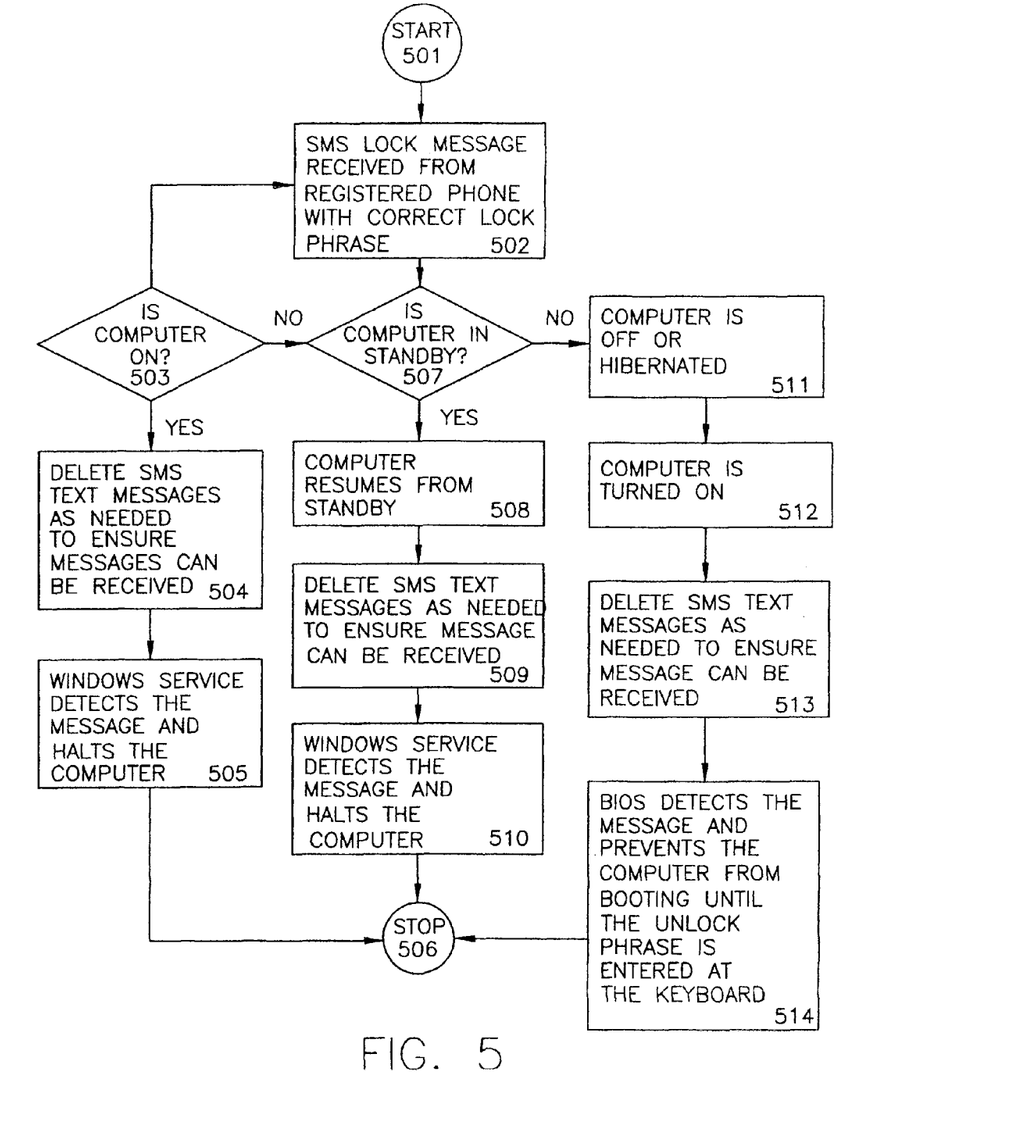
FIG. 5 provides a flow chart of lock message handling depending upon the operation state of the computer according to one embodiment of the invention.

FIG. 5 is a flow chart of SMS lock message handling depending upon the operating state of the computer (e.g. S0 (computer is running), S3 (computer is suspended where the computer memory is powered—the computer's state is saved in volatile memory), S4 (hibernation—where the computer is not powered but the computer's state is stored on the hard drive), S5 (the computer is powered off—all users are logged off and no state is saved)). The computer can receive the message while the computer is on, in standby, hibernated, or off. If there is not enough room to receive the SMS messages required while the computer is in the on state, the service will make room. If the computer is off or hibernated, BIOS will ensure there is sufficient room in the guaranteed buffer. Additionally, the service provider will buffer any "undeliverable" SMS text messages based on their policy. Thus, either the BIOS (on each computer boot), the service (if the computer is on) and/or the service provider (buffering undeliverable SMS text messages) will ensure there is sufficient space available in the guaranteed buffer, ensuring SMS message delivery.

At (501) it the process starts and an SMS lock message is received at the laptop PC (502). The message handling depends on whether the laptop PC is on (503) or in a different state (507), (511).

If the laptop PC is on, then the laptop PC deletes SMS text messages from the guaranteed buffer as necessary to ensure appropriate room for received messages (504). A service then detects the receipt of the lock message if present in the guaranteed buffer (505) (e.g. via periodic polling). Upon such detection, the service immediately stops the laptop PC (506) (via crash kill as described above).

If the laptop PC is in standby (507), upon resume from standby, the laptop PC deletes SMS text messages from the guaranteed buffer as necessary to ensure appropriate room in the guaranteed buffer for received messages (508). Again, the service will detect receipt of a lock message at the guaranteed buffer and, upon such detection, the laptop PC will likewise be stopped (506).

If the laptop PC is either off or in a state of hibernation (511), after the laptop PC is turned on (or pulled out of a state of hibernation) (512), the laptop PC (BIOS) again deletes SMS text messages from the guaranteed buffer as necessary to ensure appropriate room in the guaranteed buffer for received messages (513). Thereafter, the BIOS determines if there is a lock command in the guaranteed buffer and if so, detects the lock message is received in the guaranteed buffer and prevents the laptop PC from booting the OS until the appropriate phrase/password is entered via a user input (e.g. via a keyboard) (514). If no such password is received, the process stops and the laptop PC is prevented from proceeding with booting the OS (506).

Figure 6:
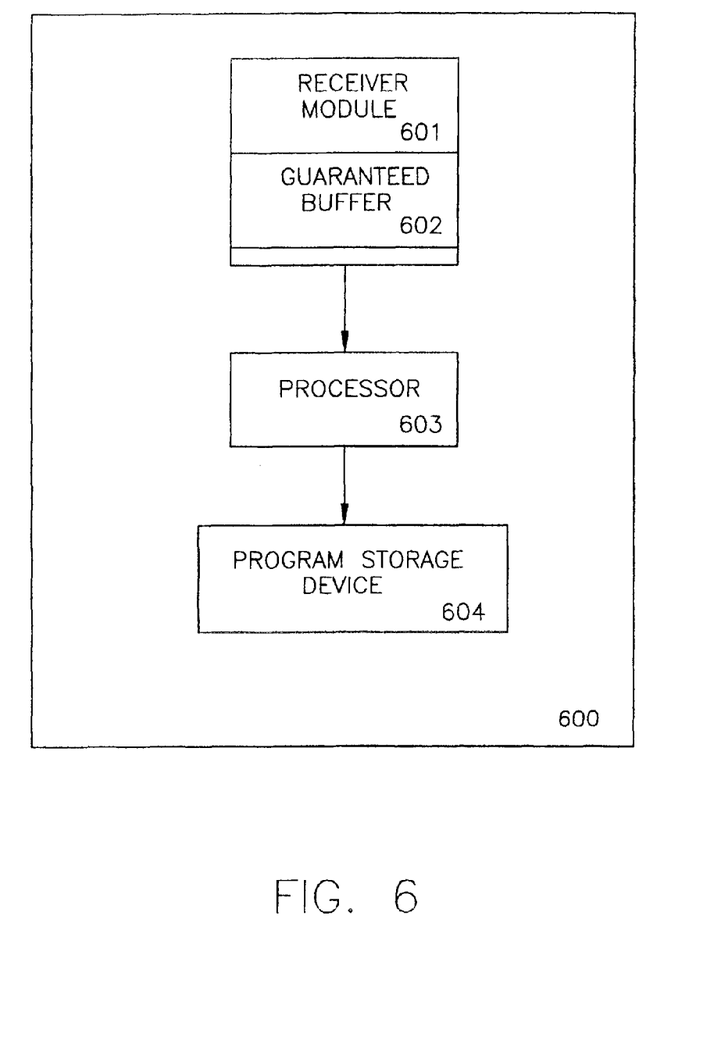
FIG. 6 provides a block diagram of a computing device according to one embodiment of the invention.

FIG. 6 is a block diagram of an electronic device according to one embodiment of the present invention. The device (600) includes a receiver module (601), a guaranteed buffer (602), a processor (603) and a program storage device (604). The device (600) may include any or all of the components of the device depicted in FIG. 1, although only select components are presented in FIG. 6 for clarity. In addition, the device (600) may be a laptop PC; however, those having ordinary skill in the art will understand that it may be any suitable electronic device. The receiver module (601) can be implemented as a wireless WAN card or any suitable device capable of receiving communications from an authorized device (e.g. receiving text messages from registered cell phone(s)). The receiver module (601) receives the communication and stores it in a guaranteed buffer (602). The guaranteed buffer is depicted as implemented as a sub-part of the receiver (601); however, a separate guaranteed buffer could also be utilized. The receiver module (601) and guaranteed buffer (602) are in communication with the other components of the device (600), such as a processor (603). The processor is in communication with and capable of executing instructions stored within a program storage device (604) for accomplishing the functionality of the invention as described herein.

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer program product can be contained, stored, communicated, propagated, or used by or in connection with an instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be reset from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

Elements of the present invention may be implemented on at least one computer running suitable software programs. These may also be implemented on at least one Integrated Circuit or part of at least one Integrated Circuit. Thus, it is to be understood that the invention may be implemented in hardware, software, or a combination of both. Thus, computer readable programs may in combination with a computer system perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

To briefly recapitulate, there is broadly contemplated herein use of SMS text messaging from a customer's registered (mobile) phone to disable a stolen or lost computer. Software running in the computer's BIOS or OS (depending upon the state of operation) will interrogate a guaranteed buffer (e.g. an SMS Text Buffer) to determine if there is a message to lock the computer. In this manner, the computer's (OS) is not allowed to function unless the current operator knows the unlock code.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. A method comprising:
receiving a lock message from an authenticated remote device at a buffer for storing sms text messages of an electronic device, said buffer for storing sms text messages being embodied on a wireless card not tied to a power state of the electronic device;
storing the lock message in the buffer;
ascertaining that the lock message is stored in the buffer; and
locking the electronic device after ascertaining that the lock message is stored in the buffer;
wherein the buffer receives power regardless of the power state of the electronic device and maintains sufficient storage space for an incoming lock message via deletion of one or more older sms text messages resident in said buffer responsive to a determination that said buffer is a certain percentage full; and
wherein the power state of the electronic device includes at least an off state and said buffer receives power in the off state.

2. The method according to claim 1, wherein the authenticated remote device is a cellular phone.

3. The method according to claim 2, wherein the lock message comprises a text message.

4. The method according to claim 1, wherein the locking step is accomplished by a BIOS running on the electronic device prior to booting an operating system of the electronic device.

5. The method according to claim 4, wherein the BIOS of the electronic device requires entry of an unlock phrase prior to booting the operating system of the electronic device after ascertaining that the lock message is stored in the buffer.

6. The method according to claim 1, wherein the ascertaining step further comprises:
utilizing an operating system service running on the electronic device to ascertain if the lock message is stored in the buffer.

7. The method according to claim 1, wherein the locking step further comprises:
utilizing an operating system service running on the electronic device to lock the electronic device.

8. The method according to claim 6, wherein the operating system service running on the electronic device shuts down the computer after ascertaining that the lock message is stored in the buffer.

9. An apparatus comprising:
a processor;
a receiver module having a buffer for storing sms text messages, said buffer for storing sms text messages being embodied on a wireless card not tied to a power state of the apparatus; and
a program storage device that tangibly stores a program of instructions that are executable by the processor of the apparatus to perform the following:
receiving a lock message from an authenticated remote device at the receiver module;
storing the lock message in the buffer;
ascertaining that the lock message is stored in the buffer; and
locking the apparatus after ascertaining that the lock message is stored in the buffer;
wherein the buffer receives power regardless of the power state of the apparatus and maintains sufficient storage space for an incoming lock message via deletion of one or more older sms text messages resident in said buffer responsive to a determination that said buffer is a certain percentage full; and
wherein the power state of the apparatus includes at least an off state and said buffer receives power in the off state.

10. The apparatus according to claim 9, wherein the authenticated remote device is a cellular phone.

11. The apparatus according to claim 10, wherein the lock message comprises a text message.

12. The apparatus according to claim 9, wherein the program of instructions that are executable by the processor of the apparatus further perform the following:
utilizing a BIOS running on the apparatus to prevent an operating system from booting after ascertaining that a lock message is stored in the buffer.

13. The apparatus according to claim 12, wherein the BIOS requires entry of an unlock phrase prior to booting an operating system after ascertaining that the lock message is stored in the buffer.

14. The apparatus according to claim 9, wherein the program of instructions that are executable by the processor of the apparatus further perform the following:

utilizing an operating system service running on the apparatus to ascertain if the lock message is stored in the buffer.

15. The apparatus according to claim 14, wherein the operating system service locks the apparatus after ascertaining that a lock message is stored in the buffer.

16. A program storage device readable by machine, tangibly embodying a program of instructions executable by a processor of the machine to perform acts comprising:
receiving a lock message from an authenticated remote device at a buffer for storing sms text messages of an electronic device, said buffer for storing sms text messages being embodied on a wireless card not tied to a power state of the electronic device;
storing the lock message in the buffer;
ascertaining that the lock message is stored in the buffer; and
locking the electronic device after ascertaining that the lock message is stored in the buffer;
wherein the buffer receives power regardless of the power state of the electronic device and maintains sufficient storage space for an incoming lock message via deletion of one or more older sms text messages resident in said buffer responsive to a determination that said buffer is a certain percentage full; and
wherein the power state of the electronic device includes at least an off state and said buffer receives power in the off state.

* * * * *